US012619617B2

(12) United States Patent　　　(10) Patent No.: US 12,619,617 B2
Xue　　　　　　　　　　　　　　　　(45) Date of Patent: May 5, 2026

(54) INFORMATION RECOMMENDATION METHOD, APPARATUS, ELECTRONIC DEVICE, AND STORAGE MEDIUM

(71) Applicant: BEIJING ZITIAO NETWORK TECHNOLOGY CO., LTD., Beijing (CN)

(72) Inventor: Bofan Xue, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/618,038

(22) Filed: Mar. 27, 2024

(65) Prior Publication Data

US 2024/0330311 A1　　　Oct. 3, 2024

(30) Foreign Application Priority Data

Mar. 28, 2023　(CN) .......................... 202310315196.2

(51) Int. Cl.
　　*G06F 16/2457*　　　(2019.01)
　　*G06F 16/9535*　　　(2019.01)
(52) U.S. Cl.
　　CPC .............................. *G06F 16/24578* (2019.01)
(58) Field of Classification Search
　　CPC ........... G06F 16/24578; G06F 16/9535; Y02D
　　　　　　　　　　　　　　　　　　　　　　　10/00
　　See application file for complete search history.

(56) References Cited

U.S. PATENT DOCUMENTS

2015/0161256 A1* 6/2015 Jeh ...................... G06F 16/9535
　　　　　　　　　　　　　　　　　　　　　　707/707
2015/0294011 A1* 10/2015 Tang ..................... G06F 16/972
　　　　　　　　　　　　　　　　　　　　　　707/722
(Continued)

FOREIGN PATENT DOCUMENTS

CN　　　104503980 A　　　4/2015
CN　　　107526807 A　　　12/2017
(Continued)

OTHER PUBLICATIONS

China National Intellectual Property Administration, Office Action and Search Report Issued in Application No. 202310315196.2, Dec. 29, 2025, 15 pages.

*Primary Examiner* — Robert W Beausoliel, Jr.
*Assistant Examiner* — Mohammad S Bhuyan
(74) *Attorney, Agent, or Firm* — Alleman Hall LLP

(57)　　　　　　　ABSTRACT

An information recommendation method, an information recommendation apparatus, an electronic device, and a storage medium are provided. The information recommendation method includes: obtaining a candidate recommendation information set which matches current search information, the candidate recommendation information set including multiple candidate recommendation information; determining, according to search volumes of the multiple candidate recommendation information within different search time limitations, sequence feature information of the candidate recommendation information set under each search time limitation, the sequence feature information being used to reflect an overall search feature corresponding to the candidate recommendation information set; and determining target recommendation information based on a trained target ranking model and the sequence feature infor- (Continued)

Obtaining a candidate recommendation information set which matches current search information, the candidate recommendation information set including multiple candidate recommendation information　　⌐ S101

↓

Determining, according to search volumes of the multiple candidate recommendation information within different search time limitations, sequence feature information of the candidate recommendation information set under each search time limitation, the sequence feature information being used to reflect an overall search feature corresponding to the candidate recommendation information set　　⌐ S102

↓

Determining target recommendation information based on a trained target ranking model and the sequence feature information of the candidate recommendation information set under each search time limitation　　⌐ S103 mation of the candidate recommendation information set under each search time limitation.

19 Claims, 2 Drawing Sheets

(56)                    References Cited

U.S. PATENT DOCUMENTS

| | | | | |
|---|---|---|---|---|
| 2017/0091343 | A1* | 3/2017 | Shorina | G06F 16/9038 |
| 2019/0114668 | A1* | 4/2019 | Zhuo | G06F 16/00 |
| 2019/0188275 | A1* | 6/2019 | Pan | G06F 16/9535 |
| 2019/0266206 | A1* | 8/2019 | Zhong | G06F 16/2465 |
| 2019/0354604 | A1* | 11/2019 | Filonov | G06F 16/90324 |
| 2021/0097410 | A1* | 4/2021 | Liu | G06N 5/04 |
| 2021/0097472 | A1* | 4/2021 | Inamdar | G06Q 10/1053 |
| 2023/0316106 | A1* | 10/2023 | Xu | G06N 3/045 |
| | | | | 706/12 |

FOREIGN PATENT DOCUMENTS

| | | |
|---|---|---|
| CN | 110532351 A | 12/2019 |
| CN | 112733024 A | 4/2021 |
| CN | 115730137 A | 3/2023 |

* cited by examiner

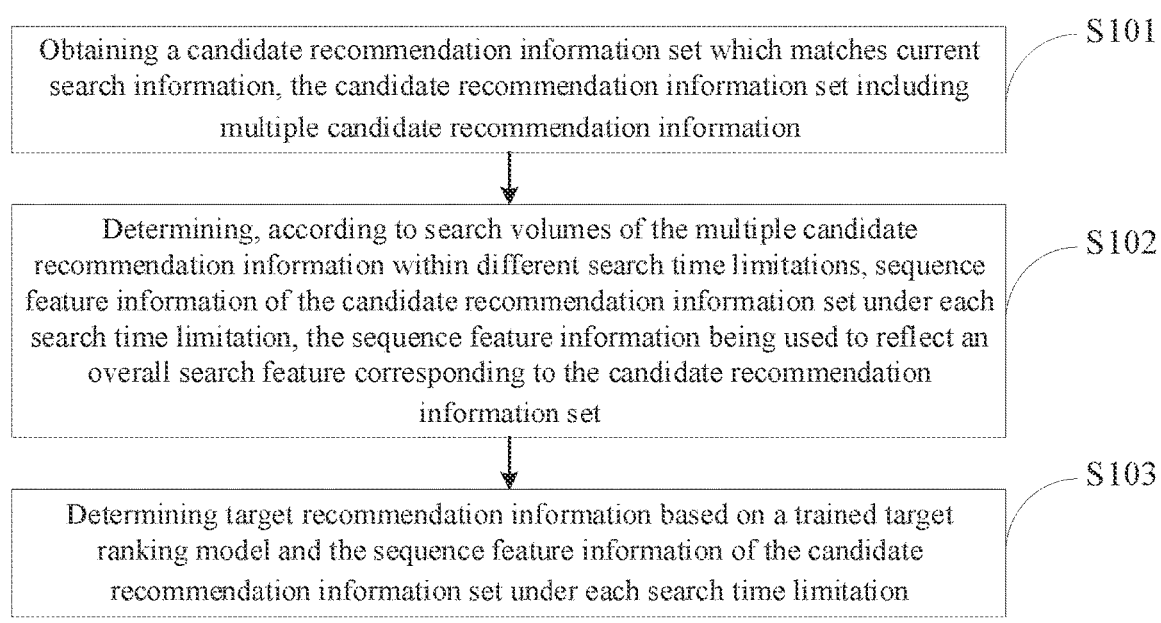

Obtaining a candidate recommendation information set which matches current search information, the candidate recommendation information set including multiple candidate recommendation information — S101

Determining, according to search volumes of the multiple candidate recommendation information within different search time limitations, sequence feature information of the candidate recommendation information set under each search time limitation, the sequence feature information being used to reflect an overall search feature corresponding to the candidate recommendation information set — S102

Determining target recommendation information based on a trained target ranking model and the sequence feature information of the candidate recommendation information set under each search time limitation — S103

FIG. 1

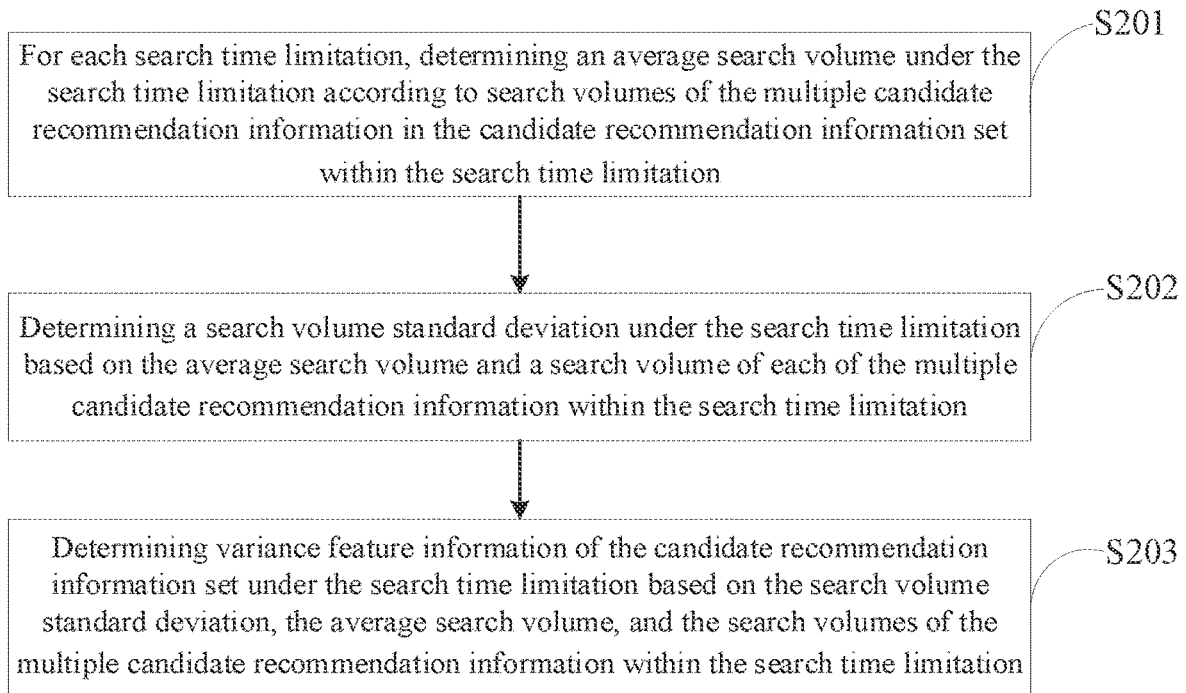

For each search time limitation, determining an average search volume under the search time limitation according to search volumes of the multiple candidate recommendation information in the candidate recommendation information set within the search time limitation — S201

Determining a search volume standard deviation under the search time limitation based on the average search volume and a search volume of each of the multiple candidate recommendation information within the search time limitation — S202

Determining variance feature information of the candidate recommendation information set under the search time limitation based on the search volume standard deviation, the average search volume, and the search volumes of the multiple candidate recommendation information within the search time limitation — S203

INFORMATION RECOMMENDATION METHOD, APPARATUS, ELECTRONIC DEVICE, AND STORAGE MEDIUM

CROSS-REFERENCE TO RELATED APPLICATION

The present application claims priority of the Chinese Patent Application No. 202310315196.2, filed on Mar. 28, 2023, the entire disclosure of which is incorporated herein by reference as part of the present application.

TECHNICAL FIELD

Embodiments of the present disclosure relate to the field of the Internet technology, in particular to an information recommendation method, an information recommendation apparatus, an electronic device, and a storage medium.

BACKGROUND

With the advancement of technology, more and more users acquire desired information through search means. For instance, a user may enter the search content within a search box to view search results related to the search content. For example, after the user enters the search content, search recommendation information related to the search content may be pushed for the user, so that the user may find desired information through the received search recommendation information. Thus, it can be seen that the precision of the search recommendation information may affect the search efficiency of the user.

SUMMARY

The embodiments of the present disclosure provide an information recommendation method, an information recommendation apparatus, an electronic device, and a storage medium.

In a first aspect, at least one embodiment of the present disclosure provides an information recommendation method, and the information recommendation method includes: obtaining a candidate recommendation information set which matches current search information, the candidate recommendation information set including multiple candidate recommendation information; determining, according to search volumes of the multiple candidate recommendation information within different search time limitations, sequence feature information of the candidate recommendation information set under each search time limitation, the sequence feature information being used to reflect an overall search feature corresponding to the candidate recommendation information set; and determining target recommendation information based on a trained target ranking model and the sequence feature information of the candidate recommendation information set under each search time limitation.

In a second aspect, at least one embodiment of the present disclosure further provides an information recommendation apparatus, and the information recommendation apparatus includes an obtaining module, a first determining module, and a second determining module. The obtaining module is configured to obtain a candidate recommendation information set which matches current search information, the candidate recommendation information set including multiple candidate recommendation information; the first determining module is configured to determine, according to search volumes of the multiple candidate recommendation information within different search time limitations, sequence feature information of the candidate recommendation information set under each search time limitation, the sequence feature information being used to reflect an overall search feature corresponding to the candidate recommendation information set; and a second determining module is configured to determine target recommendation information based on a trained target ranking model and the sequence feature information of the candidate recommendation information set under each search time limitation.

In a third aspect, at least one embodiment of the present disclosure further provides an electronic device, and the electronic device includes a processor and a memory; the memory is in communication connection to the processor; one or more computer-executable instructions are stored on the memory; and the one or more computer-executable instructions, when executed by the processor, cause the processor to perform steps of the information recommendation method according to any one of the embodiments of the present disclosure.

In a fourth aspect, at least one embodiment of the present disclosure further provides a computer-readable storage medium, the computer-readable storage medium is configured to store computer-executable instructions, and the computer-executable instructions, when executed by a processor, cause the processor to: obtain a candidate recommendation information set which matches current search information, the candidate recommendation information set including multiple candidate recommendation information; determine, according to search volumes of the multiple candidate recommendation information within different search time limitations, sequence feature information of the candidate recommendation information set under each search time limitation, the sequence feature information being used to reflect an overall search feature corresponding to the candidate recommendation information set; and determine target recommendation information based on a trained target ranking model and the sequence feature information of the candidate recommendation information set under each search time limitation.

For the information recommendation method, the information recommendation apparatus, the electronic device, and the storage medium provided by the embodiments of the present disclosure, after obtaining a candidate recommendation information set which matches current search information, sequence feature information of the candidate recommendation information set under each search time limitation is determined according to search volumes of multiple candidate recommendation information included in the candidate recommendation information set within different search time limitations. The sequence feature information is used to reflect an overall search feature corresponding to the candidate recommendation information set, for example, the sequence feature information can characterize the difference in search volumes of the multiple candidate recommendation information within the search time limitation, and the like. Thus, based on a trained target ranking model and the sequence feature information of the candidate recommendation information set under each search time limitation, the target recommendation information can be accurately determined from the candidate recommendation information set, so as to alleviate or avoid the case that a high score is given to the candidate feature information with a low search volume, thereby improving the accuracy of determination of the target recommendation information and further improving the search efficiency of the user.

Furthermore, the present disclosure is provided with various search time limitations, and the sequence feature information of the candidate recommendation information set can be enriched by acquiring the sequence feature information under various search time limitations, so that the target ranking model can accurately determine the target recommendation information based on the sequence feature information of the candidate recommendation information set under various search time limitations.

BRIEF DESCRIPTION OF DRAWINGS

In order to clearly illustrate the technical solutions of the embodiments of the present disclosure, the drawings of the embodiments will be briefly described in the following. It is obvious that the described drawings are only related to some embodiments of the present disclosure and thus are not limitative to the present disclosure. Those skilled in the art can also obtain new drawings based on these described drawings without any inventive work.

FIG. 1 is a flowchart of an information recommendation method provided by an embodiment of the present disclosure;

FIG. 2 is a flowchart of determining variance feature information in an information recommendation method provided by an embodiment of the present disclosure;

DETAILED DESCRIPTION

Figure 3:
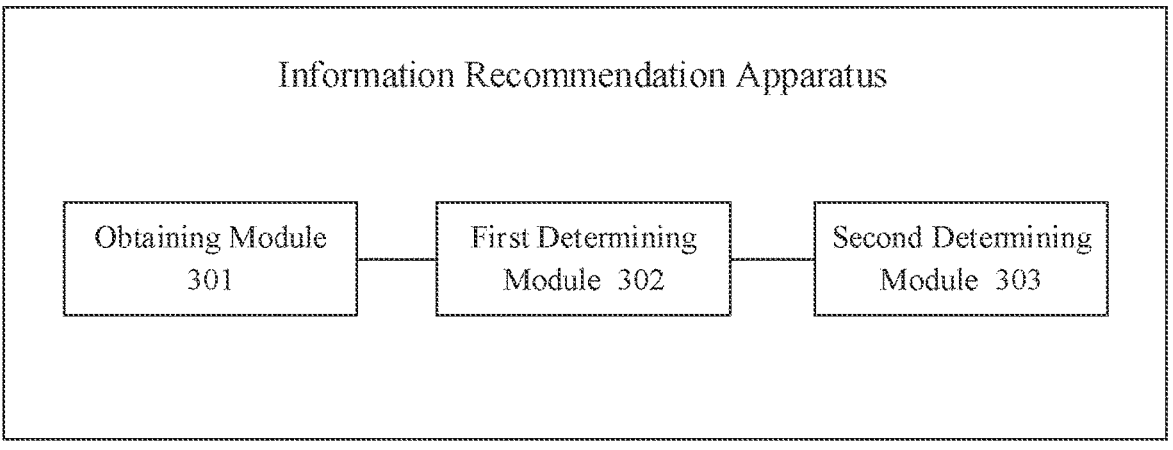
FIG. 3 is a schematic diagram of an information recommendation apparatus provided by an embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the present disclosure. While certain embodiments of the present disclosure are shown in the drawings, it should be understood that the present disclosure may be embodied in various forms and should not be construed as limited to the embodiments set forth herein. Rather, these embodiments are provided for a thorough and complete understanding of the present disclosure. Based on the described embodiments herein, those skilled in the art can obtain other embodiment(s), without any inventive work, which should be within the protection scope of the present disclosure.

After the user enters the search content, search recommendation information related to the search content may be pushed for the user, so that the user may find desired information through the received search recommendation information. Thus, it can be seen that the precision of the search recommendation information may affect the search efficiency of the user.

In general, it is possible to recall, by using a multi-path recall method, at least one piece of candidate recommendation information according to the search content input by the user, then determine the score of the candidate recommendation information according to the recall source, text features and the like of the recalled candidate recommendation information by using the ranking model, and finally determine the target recommendation information according to the score of the candidate recommendation information. However, when the candidate recommendation information can be recalled through only one path, or when the recall position of the candidate recommendation information ranks at the back, it is characterized that the likelihood of the candidate recommendation information being clicked on is relatively low, while the ranking model may give the candidate recommendation information a high score, which causes the determination of the target recommendation information to be inaccurate. Furthermore, when the target recommendation information is inaccurate, the user may need to input multiple times to find the desired information, which makes the search efficiency of the user to be lower.

Based on the above research, the present disclosure provides an information recommendation method. For example, after obtaining a candidate recommendation information set which matches current search information, sequence feature information of the candidate recommendation information set under each search time limitation is determined according to search volumes of multiple candidate recommendation information included in the candidate recommendation information set within different search time limitations. The sequence feature information is used to reflect an overall search feature corresponding to the candidate recommendation information set, for example, the sequence feature information can characterize the difference in search volumes of the multiple candidate recommendation information within the search time limitation, and the like. Thus, based on a trained target ranking model and the sequence feature information of the candidate recommendation information set under each search time limitation, the target recommendation information can be accurately determined from the candidate recommendation information set, so as to alleviate or avoid the case that a high score is given to the candidate feature information with a low search volume, thereby improving the accuracy of determination of the target recommendation information and further improving the search efficiency of the user.

Furthermore, the present disclosure is provided with various search time limitations, and the sequence feature information of the candidate recommendation information set can be enriched by acquiring the sequence feature information under various search time limitations, so that the target ranking model can accurately determine the target recommendation information based on the sequence feature information of the candidate recommendation information set under various search time limitations.

It should be understood that the various steps described in the method implementations of the present disclosure may be performed in different orders and/or in parallel. Furthermore, the method implementations may include additional steps and/or omit performing the illustrated steps. The protection scope of the present disclosure is not limited in this aspect.

As used herein, the terms "include," "comprise," and variations thereof are open-ended inclusions, i.e., "including but not limited to." The term "based on" is "based, at least in part, on." The term "an embodiment" represents "at least one embodiment," the term "another embodiment" represents "at least one additional embodiment," and the term "some embodiments" represents "at least some embodiments." Relevant definitions of other terms will be given in the description below.

It should be noted that concepts such as the "first," "second," or the like mentioned in the present disclosure are only used to distinguish different devices, modules or units, and are not used to limit the interdependence relationship or the order of functions performed by these devices, modules or units.

It should be noted that the modifications of "a," "an," "a plurality of," and the like mentioned in the present disclosure are illustrative rather than restrictive, and those skilled in the art should understand that unless the context clearly indicates otherwise, these modifications should be understood as "one or more."

It should be noted that similar numerals or letters may represent similar items in the accompanying drawings. Accordingly, once an item is defined in one drawing, it does not need to be further defined or explained in the subsequent drawings.

As used herein, the term "and/or" merely describes an associated relationship and indicates that three relationships may exist. For example, "A and/or B" may indicate three cases including: "only A exists," "both A and B exist," and "only B exists." In addition, the term "at least one" as used herein represents any one of a plurality, or any combination of at least two of the plurality. For example, including at least one of A, B, and C may represent including any one or more elements selected from a group consisting of A, B, and C.

It should be noted that the user information (including but not limited to user device information, user personal information, etc.) and data (including but not limited to data used for analysis, stored data, displayed data, etc.) involved in the present disclosure are authorized by users or fully authorized by all parties. The collection, usage and processing of relevant data is required to comply with the relevant laws, regulations and standards of relevant countries and regions, and corresponding operation portals are provided for users to choose to authorize or refuse.

For example, in response to receiving the user's active request, prompt information is sent to the user to explicitly prompt the user that the operation that the user requests to perform will require acquisition and use of personal information of the user. Thus, the user may independently determine, according to the prompt information, whether to provide personal information to software or hardware such as an electronic device, an application program, a server, or a storage medium which performs the operations of the technical solution of the present disclosure.

As an alternative but non-limiting implementation, the manner in which the prompt information is sent to the user in response to receiving the user's active request may be, for example, in the form of a pop-up window in which the prompt information may be presented in the form of text. In addition, the pop-up window may also provide a selection control for the user to select "agree" or "disagree" to provide personal information to the electronic device.

It should be understood that the above-described process of obtaining user authorization is merely illustrative and does not constitute a limitation to implementations of the present disclosure, and other ways to comply with the relevant laws and regulations may also be applied to implementations of the present disclosure.

In order to facilitate understanding of the embodiments of the present disclosure, first, an information recommendation method provided by an embodiment of the present disclosure is introduced in detail. The execution body of the information recommendation method provided by the embodiment of the present disclosure is generally an electronic device having a certain computing capability, which includes, for example, a terminal device, a server or other processing devices. For example, the terminal device may be user equipment (UE), a mobile device, a user terminal, a personal digital assistant (PDA), a handheld device, a computing device, a vehicle-mounted device, a wearable device, or the like. In some possible implementations, the information recommendation method may be implemented by way of the processor invoking computer-readable instructions stored in the memory.

The information recommendation method provided by the embodiments of the present disclosure is described below taking the terminal device as the execution entity as an example.

FIG. 1 is a flowchart of an information recommendation method provided by an embodiment of the present disclosure. The method includes following steps S101 to S103.

S101: obtaining a candidate recommendation information set which matches current search information, the candidate recommendation information set including multiple candidate recommendation information.

S102: determining, according to search volumes of the multiple candidate recommendation information within different search time limitations, sequence feature information of the candidate recommendation information set under each search time limitation, the sequence feature information being used to reflect an overall search feature corresponding to the candidate recommendation information set.

S103: determining target recommendation information based on a trained target ranking model and the sequence feature information of the candidate recommendation information set under each search time limitation.

Steps S101 to S103 are specifically described below.

For Step S101, the current search information may be input information in a search box of the application on the user terminal. During implementation, the search box can be detected, and when it is detected that there is input information, the current search information is acquired, and a candidate recommendation information set which matches the current search information is obtained. The candidate recommendation information set includes multiple candidate recommendation information.

For example, the multiple candidate recommendation information included in the candidate recommendation information set may be obtained by the multi-path recall. For example, recall sources of the multi-path recall may include, but are not limited to, social contact, search after viewing, search based on prior search, real intention, and the like. For example, the social recall may include: obtaining candidate recommendation information which matches the current search information from other user information followed by the user terminal matched with the current search information. For example, the recall corresponding to the search based on prior search may include: acquiring search information input again by a user (such as the current user or other users) after viewing search results corresponding to the current search information, and determining the search information input again as candidate recommendation information.

For Step S102, time lengths of the various search time limitations may be set as desired. For example, the various search time limitations may include short search time limitations, medium search time limitations, long search time limitations, and the like. For example, the time length of the short search time limitation may be one hour, the time length of the medium search time limitation may be one day, the time length of the long search time limitation may be one week. The time length of the search time limitation may be calculated from the current time. For example, if the current time is 10:00 on February 10, the search time period for the short search time limitation may be from 9:00 on February 10 to 10:00 on February 10, the search time period for the medium search time limitation may be from 10:00 on February 9 to 10:00 on February 10, and the search time period for the long search time limitation may be from 10:00 on February 3 to 10:00 on February 10.

During implementation, for each search time limitation, the search volume of each candidate recommendation information in the candidate recommendation information set under the search time limitation can be obtained, that is, the search volumes of the plurality of candidate recommendation information in the candidate recommendation information set within the plurality of search time limitations can be obtained. Thus, for each search time limitation, sequence feature information of the candidate recommendation information set under the search time limitation is determined according to the search volumes of the plurality of candidate recommendation information in the candidate recommendation information set within the search time limitation. The sequence feature information is used to reflect an overall search feature corresponding to the candidate recommendation information set. For instance, the search volumes of the plurality of candidate recommendation information in the candidate recommendation information set within the search time limitation can be directly determined as the sequence feature information of the candidate recommendation information set under the search time limitation.

For example, the sequence feature information includes ranking feature information and variance feature information, the ranking feature information is used to reflect a ranking feature of the multiple candidate recommendation information in the candidate recommendation information set in terms of a size of search volume, and the variance feature information is used to reflect a deviation degree of the search volumes of the multiple candidate recommendation information with respect to an average search volume corresponding to the candidate recommendation information set.

The ranking feature information is used to reflect the ranking feature of the respective candidate recommendation information in the candidate recommendation information set in terms of the size of the search volume. For example, the ranking feature information can be determined according to the following steps: for each search time limitation, ranking the multiple candidate recommendation information included in the candidate recommendation information set in an order from large to small according to the search volumes of the multiple candidate recommendation information within the search time limitation, obtaining location information of each candidate recommendation information under the search time limitation, and determining the ranking feature information of the candidate recommendation information set under the search time limitation based on the location information respectively corresponding to the respective candidate recommendation information in the candidate recommendation information set.

The variance feature information is used to reflect a degree of deviation of a search volume of each candidate recommendation information with respect to an average search volume corresponding to the candidate recommendation information set. For example, in one way, the variance feature information can be determined according to the following steps: determining an average search volume under the search time limitation according to search volumes of the multiple candidate recommendation information in the candidate recommendation information set within the search time limitation, determining a search volume difference value of the search volume of each candidate recommendation information and the average search volume, and determining the search volume difference values respectively corresponding to the multiple candidate recommendation information in the candidate recommendation information set as the variance feature information of the candidate recommendation information set under the search time limitation.

Here, the sequence feature information includes ranking feature information and variance feature information. The sequence feature information is rich and diverse, and the ranking feature and the variance feature can also be provided for the target ranking model, so that the target ranking model can learn not only the ranking feature between the plurality of candidate recommendation information but also the feature related to the search volume difference degree of the plurality of candidate recommendation information. Thus, the target recommendation information can be determined more accurately based on the sequence feature information.

For example, referring to FIG. 2, the variance feature information may be determined according to the following steps.

S201: for each search time limitation, determining an average search volume under the search time limitation according to search volumes of the multiple candidate recommendation information in the candidate recommendation information set within the search time limitation.

S202: determining a search volume standard deviation under the search time limitation based on the average search volume and a search volume of each of the multiple candidate recommendation information within the search time limitation.

S203: determining variance feature information of the candidate recommendation information set under the search time limitation based on the search volume standard deviation, the average search volume, and the search volumes of the multiple candidate recommendation information within the search time limitation.

For each search time limitation, the search volumes of the multiple candidate recommendation information in the candidate recommendation information set within the search time limitation can be summed, and the resulting search volume sum value can be divided by the total number of candidate recommendation information in the candidate recommendation information set to obtain an average search volume under the search time limitation. Further, according to the standard deviation expression, the search volume standard deviation under the search time limitation is determined based on the average search volume and the search volume of each candidate recommendation information within the search time limitation.

Thus, the variance feature information of the candidate recommendation information set under the search time limitation is determined based on the search volume standard deviation, the average search volume, and the search volume of the each candidate recommendation information within the search time limitation.

For example, determining the variance feature information of the candidate recommendation information set under the search time limitation based on the search volume standard deviation, the average search volume, and the search volumes of the multiple candidate recommendation information within the search time limitation specifically includes:

for each candidate recommendation information, determining a search volume difference value based on the average search volume and a search volume of the candidate recommendation information within the search time limitation, and dividing the search volume difference value by the search volume standard deviation to obtain a search volume ratio value of the candidate recommendation information; and determining the variance feature information of the candidate recommendation information set under the search time limitation based on search volume ratio values to which the multiple candidate recommendation information corresponds.

In implementation, for each candidate recommendation information, the search volume difference value can be obtained by calculating the difference between the search volume of the candidate recommendation information within the search time limitation and the average search volume. The search volume difference value is then divided by the search volume standard deviation to obtain a search volume ratio value of the candidate recommendation information. Thus, the search volume ratio value corresponding to each candidate recommendation information can be obtained, and the search volume ratio value can reflect the degree of deviation between the search volume of the candidate recommendation information and the average search volume. The search volume ratio values respectively corresponding to the multiple candidate recommendation information are determined as the variance feature information of the candidate recommendation information set under the search time limitation.

For Step S103, here the sequence feature information of the candidate recommendation information set under each search time limitation may be input to the target ranking model. The target ranking model may output an estimated click-through rate of each candidate recommendation information in the candidate recommendation information set, and determine the target recommendation information based on the estimated click-through rates corresponding to the respective candidate recommendation information. For example, the predetermined number of candidate recommendation information with higher estimated click-through rates may be selected as the target recommendation information.

For example, determining the target recommendation information based on the trained target ranking model and the sequence feature information of the candidate recommendation information set under each search time limitation specifically includes:

Step a1: determining candidate feature information of each candidate recommendation information in the candidate recommendation information set, the candidate feature information including text feature information and/or vertical category feature information.

Step a2: obtaining historical feature information authorized by a user, the historical feature information including behavior feature information and/or background feature information.

Step a3: determining, by using the target ranking model, the target recommendation information based on the historical feature information, the candidate feature information of each candidate recommendation information in the candidate recommendation information set, and the sequence feature information of the candidate recommendation information set under each search time limitation.

When implemented, it is also possible to determine the candidate feature information of each candidate recommendation information, and the candidate feature information is used to reflect the own feature of the candidate recommendation information. The candidate recommendation information includes text feature information and/or vertical category feature information. For example, the text feature information may include the text content, the number of characters, language information, matching degree of the candidate recommendation information with the current search information, and the vertical category feature information may include the number of followers of the account, the number of publication contents of the account, and the like corresponding to the candidate recommendation information.

Further, the historical feature information authorized by the user can also be obtained. The historical feature information is historical feature information of the user terminal that inputs the current search information, and the historical feature information is used to reflect the feature that the user terminal has. The historical feature information includes behavioral feature information and/or background feature information. For example, the behavioral feature information may include a user identity (ID), a historical search behavior, and the like, and the background feature information may include a region where the user terminal is located, a text content of the current search information, a language, a request source, and the like.

After the historical feature information and the candidate feature information of each candidate recommendation information are obtained, the historical feature information, the candidate feature information of each candidate recommendation information, and the sequence feature information of the candidate recommendation information set under each search time limitation can be input to the target ranking model. The target ranking model determines an estimated click-through rate of each candidate recommendation information, and determines the target recommendation information according to the estimated click-through rate of each candidate recommendation information.

Here, by obtaining the historical feature information and the candidate feature information of each candidate recommendation information, the feature content can be enriched. For example, the overall search feature of the candidate recommendation information set, the relevant feature of the user side, and the own feature of each candidate recommendation information may be obtained. Thus, the target recommendation information can be determined more accurately using the target ranking model based on the above-obtained various kinds of feature information, so as to improve the search efficiency.

For example, the target ranking model includes a first ranking model and a second ranking model. The model accuracy of the second ranking model may be greater than the model accuracy of the first ranking model. For example, the first ranking model may be a trained roughly-ranking model, and the second ranking model may be a trained fine-ranking model. The model structures of the first ranking model and the second ranking model may be set as desired.

In Step a3, determining, by using the target ranking model, the target recommendation information based on the historical feature information, the candidate feature information of each candidate recommendation information in the candidate recommendation information set, and the sequence feature information of the candidate recommendation information set under each search time limitation specifically includes:

Step a31: selecting partial feature information from a group consisting of the historical feature information, the candidate feature information of each candidate recommendation information in the candidate recommendation information set, and the sequence feature information of the candidate recommendation information set under each search time limitation; and determining, based on the partial feature information and the first ranking model, a first ranking result of the multiple candidate recommendation information in the candidate recommendation information set.

Step a32: determining, by using the second ranking model, a second ranking result of the multiple candidate recommendation information in the candidate recommendation information set based on the first ranking result, the historical feature information, the candidate feature information of each candidate recommendation information in the candidate recommendation information set, and the sequence feature information of the candidate recommendation information set under each search time limitation.

Step a33: determining, according to the second ranking result, the target recommendation information from the candidate recommendation information set.

When implemented, the partial feature information may be selected from the historical feature information, the candidate feature information of each candidate recommendation information, and the sequence feature information of the candidate recommendation information set under each search time limitation, and the selection of the partial feature information may be set as needed. The partial feature information is input to the first ranking model, an initial click-through rate of each candidate recommendation information is predicted, and the first ranking result of the multiple candidate recommendation information may be obtained according to the initial click-through rates respectively corresponding to the respective candidate recommendation information.

Then the second ranking result of the multiple candidate recommendation information in the candidate recommendation information set can be determined using the second ranking model based on the first ranking result, the historical feature information, the candidate feature information of each candidate recommendation information, and the sequence feature information of the candidate recommendation information set under each search time limitation. The second ranking result may include ranked positions of the plurality of candidate recommendation information, an estimated click-through rate to which each candidate recommendation information corresponds, and the like.

According to the second ranking result, the target recommendation information is determined from the candidate recommendation information set. For example, the candidate recommendation information with a larger estimated click-through rate is selected as the target recommendation information.

For example, in Step a31, determining, according to the second ranking result, the target recommendation information from the candidate recommendation information set specifically includes:

selecting, according to ranked positions of the multiple candidate recommendation information as indicated by the second ranking result, a preset number of candidate recommendation information from the candidate recommendation information set, and determining the preset number of candidate recommendation information as the target recommendation information; and/or selecting, according to an estimated click-through rate of each candidate recommendation information as indicated by the second ranking result, candidate recommendation information with an estimated click-through rate greater than a threshold value from the candidate recommendation information set, and determining the candidate recommendation information with the estimated click-through rate greater than the threshold value as the target recommendation information.

When implemented, the preset number can be set, and according to the ranked positions of the plurality of candidate recommendation information as indicated by the second ranking result, the preset number of candidate recommendation information can be selected from the candidate recommendation information set. For example, the preset number of candidate recommendation information at top ranked positions may be selected as the target recommendation information.

Alternatively, it is also possible to set a threshold value, and according to the estimated click-through rate of each candidate recommendation information as indicated by the second ranking result, the candidate recommendation information with an estimated click-through rate greater than the threshold value may be selected from the candidate recommendation information set and determined as the target recommendation information.

Further alternatively, it is also possible to set both the preset number and the threshold value. According to the estimated click-through rate of each candidate recommendation information as indicated by the second ranking result, the candidate recommendation information with an estimated click-through rate greater than the threshold value may be first selected from the candidate recommendation information set. If the number of the selected candidate recommendation information is greater than the preset number, the preset number of candidate recommendation information is selected from the selected candidate recommendation information according to the ranked position and determined as the target recommendation information. If the number of the selected candidate recommendation information is less than the preset number, the selected candidate recommendation information is determined as the target recommendation information.

Here, the target recommendation information can be flexibly determined by setting various ways, so that the target recommendation information may approach the search demand of the user.

It can be understood by those skilled in the art that in the above described method of the specific implementation, the order in which the steps are written does not imply a strict order of execution and accordingly does not constitute any limitation on the implementation of the process, and the specific order of execution of the steps should be determined according to the functionality and the underlying logic.

It needs to be noted that in the embodiments of the present disclosure, the flow of the information recommendation method provided by the foregoing embodiments of the present disclosure may include more or less operations, and these operations may be performed in sequence or performed in parallel. While the flow of the information recommendation method described above includes a plurality of operations occurring in a particular order, it should be clearly understood that the order of the plurality of operations is not limited. The information recommendation method described above may be performed once or may be performed multiple times according to a predetermined condition.

Based on the same inventive concept, an information recommendation apparatus corresponding to the information recommendation method is further provided by the embodiments of the present disclosure. The principle of solving the problem by the apparatus in the embodiments of the present disclosure is similar to that of the above-mentioned information recommendation method provided by the embodiments of the present disclosure, therefore the implementation of the apparatus can refer to the implementation of the method, and details are not repeated herein.

FIG. 3 is a schematic diagram of an information recommendation apparatus provided by an embodiment of the present disclosure. The apparatus includes: an obtaining module 301, a first determining module 302, and a second determining module 303.

The obtaining module 301 is configured to obtain a candidate recommendation information set which matches current search information. The candidate recommendation information set includes multiple candidate recommendation information.

The first determining module 302 is configured to determine, according to search volumes of the multiple candidate recommendation information within different search time limitations, sequence feature information of the candidate recommendation information set under each search time limitation. The sequence feature information is used to reflect an overall search feature corresponding to the candidate recommendation information set.

The second determining module 303 is configured to determine target recommendation information based on a trained target ranking model and the sequence feature information of the candidate recommendation information set under each search time limitation.

For example, the sequence feature information includes ranking feature information and variance feature information. The ranking feature information is used to reflect a ranking feature of the multiple candidate recommendation information in the candidate recommendation information set in terms of a size of search volume, and the variance feature information is used to reflect a deviation degree of the search volumes of the multiple candidate recommendation information with respect to an average search volume corresponding to the candidate recommendation information set.

For example, the first determining module 302 is configured to determine the variance feature information according to the following steps:

for each search time limitation, determining an average search volume under the search time limitation according to search volumes of the multiple candidate recommendation information in the candidate recommendation information set within the search time limitation;

determining a search volume standard deviation under the search time limitation based on the average search volume and a search volume of each of the multiple candidate recommendation information within the search time limitation; and determining variance feature information of the candidate recommendation information set under the search time limitation based on the search volume standard deviation, the average search volume, and the search volumes of the multiple candidate recommendation information within the search time limitation.

For example, when the first determining module 302 is configured to determine the variance feature information of the candidate recommendation information set under the search time limitation based on the search volume standard deviation, the average search volume, and the search volumes of the multiple candidate recommendation information within the search time limitation, the first determining module 302 is specifically configured to:

for each candidate recommendation information, determine a search volume difference value based on the average search volume and a search volume of the candidate recommendation information within the search time limitation, and divide the search volume difference value by the search volume standard deviation to obtain a search volume ratio value of the candidate recommendation information; and determine the variance feature information of the candidate recommendation information set under the search time limitation based on search volume ratio values to which the multiple candidate recommendation information corresponds.

For example, when the second determining module 303 is configured to determine the target recommendation information based on the trained target ranking model and the sequence feature information of the candidate recommendation information set under each search time limitation, the second determining module 303 is specifically configured to:

determine candidate feature information of each candidate recommendation information in the candidate recommendation information set, the candidate feature information including text feature information and/or vertical category feature information;

obtain historical feature information authorized by a user, the historical feature information including behavior feature information and/or background feature information; and determine, by using the target ranking model, the target recommendation information based on the historical feature information, the candidate feature information of each candidate recommendation information in the candidate recommendation information set, and the sequence feature information of the candidate recommendation information set under each search time limitation.

For example, the target ranking model includes a first ranking model and a second ranking model, and when the second determining module 303 is configured to determine, by using the target ranking model, the target recommendation information based on the historical feature information, the candidate feature information of each candidate recommendation information in the candidate recommendation information set, and the sequence feature information of the candidate recommendation information set under each search time limitation, the second determining module 303 is specifically configured to:

select partial feature information from a group consisting of the historical feature information, the candidate feature information of each candidate recommendation information in the candidate recommendation information set, and the sequence feature information of the candidate recommendation information set under each search time limitation;

determine, based on the partial feature information and the first ranking model, a first ranking result of the multiple candidate recommendation information in the candidate recommendation information set;

determine, by using the second ranking model, a second ranking result of the multiple candidate recommendation information in the candidate recommendation information set based on the first ranking result, the historical feature information, the candidate feature information of each candidate recommendation information in the candidate recommendation information set, and the sequence feature information of the candidate recommendation information set under each search time limitation; and determine, according to the second ranking result, the target recommendation information from the candidate recommendation information set.

For example, when the second determining module 303 is configured to determine, according to the second ranking result, the target recommendation information from the candidate recommendation information set, the second determining module 303 is specifically configured to:

select, according to ranked positions of the multiple candidate recommendation information as indicated by the second ranking result, a preset number of candidate recommendation information from the candidate recommendation information set, and determine the preset number of candidate recommendation information as the target recommendation information; and/or select, according to an estimated click-through rate of each candidate recommendation information as indicated by the second ranking result, candidate recommendation information with an estimated click-through rate greater than a threshold value from the candidate recommendation information set, and determine the candidate recommendation information with the estimated click-through rate greater than the threshold value as the target recommendation information.

The description of the processing flow of the respective modules in the apparatus, and the interaction flow between the respective modules in the apparatus can refer to the related description in the above method embodiments, and details are not repeated herein.

Figure 4:
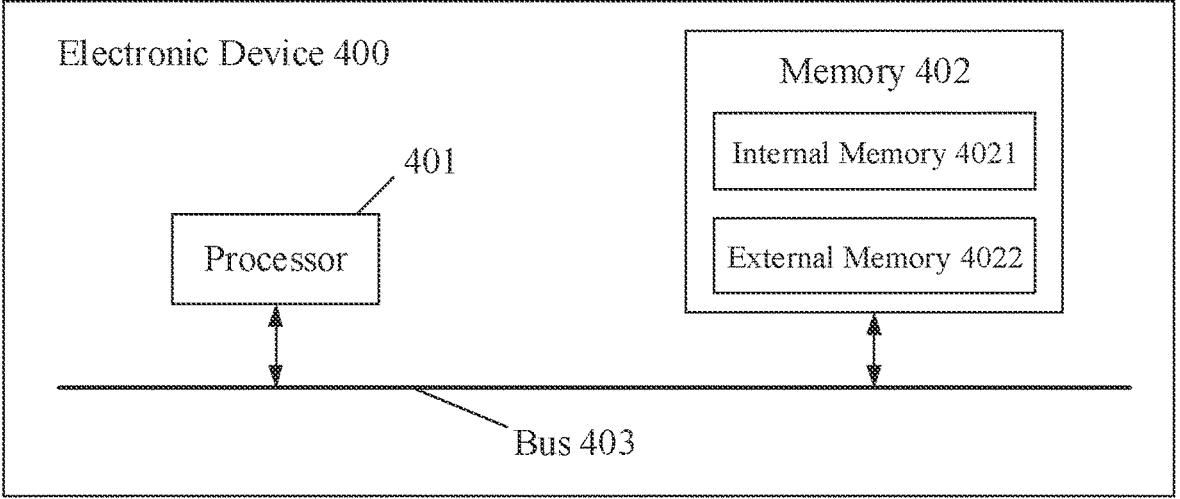
FIG. 4 is a schematic structural diagram of an electronic device provided by an embodiment of the present disclosure.

Based on the same technical concept, the embodiments of the present disclosure further provide an electronic device. FIG. 4 is a schematic structural diagram of an electronic device provided by an embodiment of the present disclosure. The electronic device 400 includes a processor 401, a memory 402, and a bus 403. The memory 402 is used to store instructions for execution, and for example includes an internal memory 4021 and an external memory 4022. The internal memory 4021, also referred to herein as a random-access memory, is used to temporarily store operational data in the processor 401 and data exchanged with the external memory 4022 such as the hard disk. The processor 401 exchanges data with the external memory 4022 through the internal memory 4021. The processor 401 and the memory 402 are in communication connection through the bus 403, and when the electronic device 400 operates, the processor 401 is caused to execute the following instructions:

obtaining a candidate recommendation information set which matches current search information, the candidate recommendation information set including multiple candidate recommendation information;

determining, according to search volumes of the multiple candidate recommendation information within different search time limitations, sequence feature information of the candidate recommendation information set under each search time limitation, the sequence feature information being used to reflect an overall search feature corresponding to the candidate recommendation information set; and determining target recommendation information based on a trained target ranking model and the sequence feature information of the candidate recommendation information set under each search time limitation.

For example, in some embodiments of the present disclosure, in the instructions executed by the processor 401, the sequence feature information includes ranking feature information and variance feature information, the ranking feature information is used to reflect a ranking feature of the multiple candidate recommendation information in the candidate recommendation information set in terms of a size of search volume, and the variance feature information is used to reflect a deviation degree of the search volumes of the multiple candidate recommendation information with respect to an average search volume corresponding to the candidate recommendation information set.

For example, in some embodiments of the present disclosure, in the instructions executed by the processor 401, the variance feature information is determined according to steps including:

for each search time limitation, determining an average search volume under the search time limitation according to search volumes of the multiple candidate recommendation information in the candidate recommendation information set within the search time limitation;

determining a search volume standard deviation under the search time limitation based on the average search volume and a search volume of each of the multiple candidate recommendation information within the search time limitation; and determining variance feature information of the candidate recommendation information set under the search time limitation based on the search volume standard deviation, the average search volume, and the search volumes of the multiple candidate recommendation information within the search time limitation.

For example, in some embodiments of the present disclosure, in the instructions executed by the processor 401, determining the variance feature information of the candidate recommendation information set under the search time limitation based on the search volume standard deviation, the average search volume, and the search volumes of the multiple candidate recommendation information within the search time limitation includes:

for each candidate recommendation information, determining a search volume difference value based on the average search volume and a search volume of the candidate recommendation information within the search time limitation, and dividing the search volume difference value by the search volume standard deviation to obtain a search volume ratio value of the candidate recommendation information; and determining the variance feature information of the candidate recommendation information set under the search time limitation based on search volume ratio values to which the multiple candidate recommendation information corresponds.

For example, in some embodiments of the present disclosure, in the instructions executed by the processor 401, determining the target recommendation information based on the trained target ranking model and the sequence feature information of the candidate recommendation information set under each search time limitation includes:

determining candidate feature information of each candidate recommendation information in the candidate recommendation information set, the candidate feature information including text feature information and/or vertical category feature information;

obtaining historical feature information authorized by a user, the historical feature information including behavior feature information and/or background feature information; and determining, by using the target ranking model, the target recommendation information based on the historical feature information, the candidate feature information of each candidate recommendation information in the candidate recommendation information set, and the sequence feature information of the candidate recommendation information set under each search time limitation.

For example, in some embodiments of the present disclosure, in the instructions executed by the processor 401, the target ranking model includes a first ranking model and a second ranking model, and determining, by using the target ranking model, the target recommendation information based on the historical feature information, the candidate feature information of each candidate recommendation information in the candidate recommendation information set, and the sequence feature information of the candidate recommendation information set under each search time limitation includes:

selecting partial feature information from a group consisting of the historical feature information, the candidate feature information of each candidate recommendation information in the candidate recommendation information set, and the sequence feature information of the candidate recommendation information set under each search time limitation;

determining, based on the partial feature information and the first ranking model, a first ranking result of the multiple candidate recommendation information in the candidate recommendation information set;

determining, by using the second ranking model, a second ranking result of the multiple candidate recommendation information in the candidate recommendation information set based on the first ranking result, the historical feature information, the candidate feature information of each candidate recommendation information in the candidate recommendation information set, and the sequence feature information of the candidate recommendation information set under each search time limitation; and determining, according to the second ranking result, the target recommendation information from the candidate recommendation information set.

For example, in some embodiments of the present disclosure, in the instructions executed by the processor 401, determining, according to the second ranking result, the target recommendation information from the candidate recommendation information set includes:

selecting, according to ranked positions of the multiple candidate recommendation information as indicated by the second ranking result, a preset number of candidate recommendation information from the candidate recommendation information set, and determining the preset number of candidate recommendation information as the target recommendation information; and/or selecting, according to an estimated click-through rate of each candidate recommendation information as indicated by the second ranking result, candidate recommendation information with an estimated click-through rate greater than a threshold value from the candidate recommendation information set, and determining the candidate recommendation information with the estimated click-through rate greater than the threshold value as the target recommendation information.

The embodiments of the present disclosure further provide a computer-readable storage medium. The computer-readable storage medium stores computer-executable instructions. When the computer-executable instructions are executed by a processor, the computer-executable instructions cause the processor to implement the information recommendation method provided by any one of the embodiments of the present disclosure.

For example, according to the embodiments of the present disclosure, the method described above with reference to the flowchart may be implemented as computer software programs. For example, the embodiments of the present disclosure include a computer program product, including a computer program carried on a non-transitory computer-readable medium, and the computer program includes program codes for executing the method as illustrated in the flowchart.

It should be noted that, in the context of the present disclosure, the computer-readable medium described above may be a computer-readable signal medium or a computer-readable storage medium, or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program codes contained on the computer-readable medium may be transmitted by using any suitable medium, including but not limited to an electric wire, a fiber-optic cable, radio frequency (RF) and the like, or any appropriate combination of them.

The above-described computer-readable medium may be included in the above-described electronic device, or may also exist alone without being assembled into the electronic device.

The computer program codes for performing the operations of the present disclosure may be written in one or more programming languages or a combination thereof. The above-described programming languages include but are not limited to object-oriented programming languages, such as Java, Smalltalk, C++, and also include conventional procedural programming languages, such as the "C" programming language or similar programming languages. The program codes may by executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flow chart and block diagrams in the accompanying drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The units involved in the embodiments of the present disclosure may be implemented in software or hardware. Among them, the name of the unit does not constitute a limitation on the unit itself under certain circumstances.

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the computer-readable medium may be a tangible medium that may contain or store programs for use by an instruction execution system, an apparatus, or a device, or for use in combination with an instruction execution system, an apparatus, or a device. The computer-readable medium may be a computer-readable signal medium or a computer-readable storage medium, or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them.

According to one or more embodiments of the present disclosure, an information recommendation method, comprising:

obtaining a candidate recommendation information set which matches current search information, wherein the candidate recommendation information set comprises multiple candidate recommendation information;

determining, according to search volumes of the multiple candidate recommendation information within different search time limitations, sequence feature information of the candidate recommendation information set under each search time limitation, wherein the sequence feature information is used to reflect an overall search feature corresponding to the candidate recommendation information set; and determining target recommendation information based on a trained target ranking model and the sequence feature information of the candidate recommendation information set under each search time limitation.

According to one or more embodiments of the present disclosure, the sequence feature information comprises ranking feature information and variance feature information, the ranking feature information is used to reflect a ranking feature of the multiple candidate recommendation information in the candidate recommendation information set in terms of a size of search volume, and the variance feature information is used to reflect a deviation degree of the search volumes of the multiple candidate recommendation information with respect to an average search volume corresponding to the candidate recommendation information set.

According to one or more embodiments of the present disclosure, the variance feature information is determined according to steps comprising:

for each search time limitation, determining an average search volume under the search time limitation according to search volumes of the multiple candidate recommendation information in the candidate recommendation information set within the search time limitation;

determining a search volume standard deviation under the search time limitation based on the average search volume and a search volume of each of the multiple candidate recommendation information within the search time limitation; and determining variance feature information of the candidate recommendation information set under the search time limitation based on the search volume standard deviation, the average search volume, and the search volumes of the multiple candidate recommendation information within the search time limitation.

According to one or more embodiments of the present disclosure, determining the variance feature information of the candidate recommendation information set under the search time limitation based on the search volume standard deviation, the average search volume, and the search volumes of the multiple candidate recommendation information within the search time limitation comprises:

for each candidate recommendation information, determining a search volume difference value based on the average search volume and a search volume of the candidate recommendation information within the search time limitation, and dividing the search volume difference value by the search volume standard deviation to obtain a search volume ratio value of the candidate recommendation information; and determining the variance feature information of the candidate recommendation information set under the search time limitation based on search volume ratio values to which the multiple candidate recommendation information corresponds.

According to one or more embodiments of the present disclosure, determining the target recommendation information based on the trained target ranking model and the sequence feature information of the candidate recommendation information set under each search time limitation comprises:

determining candidate feature information of each candidate recommendation information in the candidate recommendation information set, wherein the candidate feature information comprises text feature information and/or vertical category feature information;

obtaining historical feature information authorized by a user, wherein the historical feature information comprises behavior feature information and/or background feature information; and determining, by using the target ranking model, the target recommendation information based on the historical feature information, the candidate feature information of each candidate recommendation information in the candidate recommendation information set, and the sequence feature information of the candidate recommendation information set under each search time limitation.

According to one or more embodiments of the present disclosure, the target ranking model comprises a first ranking model and a second ranking model, and determining, by using the target ranking model, the target recommendation information based on the historical feature information, the candidate feature information of each candidate recommendation information in the candidate recommendation information set, and the sequence feature information of the candidate recommendation information set under each search time limitation comprises:

selecting partial feature information from a group consisting of the historical feature information, the candidate feature information of each candidate recommendation information in the candidate recommendation information set, and the sequence feature information of the candidate recommendation information set under each search time limitation;

determining, based on the partial feature information and the first ranking model, a first ranking result of the multiple candidate recommendation information in the candidate recommendation information set;

determining, by using the second ranking model, a second ranking result of the multiple candidate recommendation information in the candidate recommendation information set based on the first ranking result, the historical feature information, the candidate feature information of each candidate recommendation information in the candidate recommendation information set, and the sequence feature information of the candidate recommendation information set under each search time limitation; and determining, according to the second ranking result, the target recommendation information from the candidate recommendation information set.

According to one or more embodiments of the present disclosure, determining, according to the second ranking result, the target recommendation information from the candidate recommendation information set comprises:

selecting, according to ranked positions of the multiple candidate recommendation information as indicated by the second ranking result, a preset number of candidate recommendation information from the candidate recommendation information set, and determining the preset number of candidate recommendation information as the target recommendation information; and/or selecting, according to an estimated click-through rate of each candidate recommendation information as indicated by the second ranking result, candidate recommendation information with an estimated click-through rate greater than a threshold value from the candidate recommendation information set, and determining the candidate recommendation information with the estimated click-through rate greater than the threshold value as the target recommendation information.

According to one or more embodiments of the present disclosure, an information recommendation apparatus, comprising:

an obtaining module, configured to obtain a candidate recommendation information set which matches current search information, wherein the candidate recommendation information set comprises multiple candidate recommendation information;

a first determining module, configured to determine, according to search volumes of the multiple candidate recommendation information within different search time limitations, sequence feature information of the candidate recommendation information set under each search time limitation, wherein the sequence feature information is used to reflect an overall search feature corresponding to the candidate recommendation information set; and a second determining module, configured to determine target recommendation information based on a trained target ranking model and the sequence feature information of the candidate recommendation information set under each search time limitation.

According to one or more embodiments of the present disclosure, an electronic device, comprising: a processor; and a memory, being in communication connection to the processor, wherein one or more computer-executable instructions are stored on the memory, and the one or more computer-executable instructions, when executed by the processor, cause the processor to perform steps of the information recommendation method according to any one of the embodiments of the present disclosure.

According to one or more embodiments of the present disclosure, a computer-readable storage medium, wherein the computer-readable storage medium is configured to store computer-executable instructions, and the computer-executable instructions, when executed by a processor, cause the processor to:

obtain a candidate recommendation information set which matches current search information, wherein the candidate recommendation information set comprises multiple candidate recommendation information;

determine, according to search volumes of the multiple candidate recommendation information within different search time limitations, sequence feature information of the candidate recommendation information set under each search time limitation, wherein the sequence feature information is used to reflect an overall search feature corresponding to the candidate recommendation information set; and determine target recommendation information based on a trained target ranking model and the sequence feature information of the candidate recommendation information set under each search time limitation.

The foregoing are merely descriptions of the preferred embodiments of the present disclosure and the explanations of the technical principles involved. It should be understood by those skilled in the art that the scope of the disclosure involved herein is not limited to the technical solutions formed by a specific combination of the technical features described above, and shall cover other technical solutions formed by any combination of the technical features described above or equivalent features thereof without departing from the concept of the present disclosure. For example, the technical features described above may be mutually replaced with the technical features having similar functions disclosed herein (but not limited thereto) to form new technical solutions.

In addition, while operations have been described in a particular order, it shall not be construed as requiring that such operations are performed in the stated specific order or sequence. Under certain circumstances, multitasking and parallel processing may be advantageous. Similarly, while some specific implementation details are included in the above discussions, these shall not be construed as limitations to the scope of the present disclosure. Some features described in the context of a separate embodiment may also be combined in a single embodiment. Rather, various features described in the context of a single embodiment may also be implemented separately or in any appropriate sub-combination in a plurality of embodiments.

Although the present subject matter has been described in a language specific to structural features and/or logical method actions, it should be understood that the subject matter defined in the appended claims is not necessarily limited to the particular features and actions described above. Rather, the particular features and actions described above are merely exemplary forms for implementing the claims.

The invention claimed is:

1. An information recommendation method, implemented by a terminal device, comprising:

receiving input information in a search box of an application program as current search information through a GUI (graphical user interface) of the terminal device, and obtaining a candidate recommendation information set which matches the current search information, wherein the candidate recommendation information set comprises multiple candidate recommendation information, the multiple candidate recommendation information comes from multi-path recall, recall sources of the multi-path recall comprise at least one of selected from the group consisting of: user behavior of a user terminal matched with the current search information, social contact of the user terminal, and historical search mode, wherein data of the recall sources is stored in a storage device, and the multiple candidate recommendation information is obtained by accessing the storage device;

determining, according to search volumes of the multiple candidate recommendation information within different search time limitations, sequence feature information of the candidate recommendation information set under each search time limitation, wherein the sequence feature information is used to reflect an overall search feature corresponding to the candidate recommendation information set;

determining target recommendation information based on a trained target ranking model and the sequence feature information of the candidate recommendation information set under each search time limitation; and displaying the target recommendation information on the GUI;

wherein the determining target recommendation information based on the trained target ranking model and the sequence feature information of the candidate recommendation information set under each search time limitation, comprises:

inputting, by the terminal device, the sequence feature information of the candidate recommendation information set under each search time limitation to the trained target ranking model that is run in the terminal device, to obtain an estimated click-through rate corresponding to each candidate recommendation information in the candidate recommendation information set;

based on the estimated click-through rate corresponding to each candidate recommendation information, selecting a predetermined number of candidate recommendation information as the target recommendation information;

wherein the trained target ranking model comprises a first ranking model and a second ranking model, and a model accuracy of the second ranking model is greater than a model accuracy of the first ranking model, inputting, by the terminal device, the sequence feature information of the candidate recommendation information set under each search time limitation to the trained target ranking model that is run in the terminal device, to obtain the estimated click-through rate corresponding to each candidate recommendation information in the candidate recommendation information set, comprises:

selecting partial feature information in a feature information set comprising the sequence feature information of the candidate recommendation information set under each search time limitation, and inputting the selected partial feature information into the first ranking model running in the terminal device, and predicting an initial click-through rate of each candidate recommendation information;

determining a first ranking result of the multiple candidate recommendation information according to the initial click-through rate corresponding to each candidate recommendation information; and determining, based on the first ranking result and the sequence feature information of the candidate recommendation information set under each search time limitation, the estimated click-through rate corresponding to each candidate recommendation information by using the second ranking model running in the terminal device.

2. The method according to claim 1, wherein the sequence feature information comprises ranking feature information and variance feature information, the ranking feature information is used to reflect a ranking feature of the multiple candidate recommendation information in the candidate recommendation information set in terms of a size of search volume, and the variance feature information is used to reflect a deviation degree of the search volumes of the multiple candidate recommendation information with respect to an average search volume corresponding to the candidate recommendation information set.

3. The method according to claim 2, wherein the variance feature information is determined according to steps comprising:

for each search time limitation, determining an average search volume under the search time limitation according to search volumes of the multiple candidate recommendation information in the candidate recommendation information set within the search time limitation;

determining a search volume standard deviation under the search time limitation based on the average search volume and a search volume of each of the multiple candidate recommendation information within the search time limitation; and determining variance feature information of the candidate recommendation information set under the search time limitation based on the search volume standard deviation, the average search volume, and the search volumes of the multiple candidate recommendation information within the search time limitation.

4. The method according to claim 3, wherein determining the variance feature information of the candidate recommendation information set under the search time limitation based on the search volume standard deviation, the average search volume, and the search volumes of the multiple candidate recommendation information within the search time limitation comprises:

for each candidate recommendation information, determining a search volume difference value based on the average search volume and a search volume of the candidate recommendation information within the search time limitation, and dividing the search volume difference value by the search volume standard deviation to obtain a search volume ratio value of the candidate recommendation information; and determining the variance feature information of the candidate recommendation information set under the search time limitation based on search volume ratio values to which the multiple candidate recommendation information corresponds.

5. The method according to claim 1, wherein determining the target recommendation information based on the trained target ranking model and the sequence feature information of the candidate recommendation information set under each search time limitation comprises:

determining candidate feature information of each candidate recommendation information in the candidate recommendation information set, wherein the candidate feature information comprises text feature information and/or vertical category feature information;

obtaining historical feature information authorized by a user, wherein the historical feature information comprises behavior feature information and/or background feature information; and determining, by using the trained target ranking model, the target recommendation information based on the historical feature information, the candidate feature information of each candidate recommendation information in the candidate recommendation information set, and the sequence feature information of the candidate recommendation information set under each search time limitation.

6. The method according to claim 5, wherein the feature information set further comprises the historical feature information, and the candidate feature information of each candidate recommendation information in the candidate recommendation information set, and determining, by using the trained target ranking model, the target recommendation information based on the historical feature information, the candidate feature information of each candidate recommendation information in the candidate recommendation information set, and the sequence feature information of the candidate recommendation information set under each search time limitation comprises:

selecting the partial feature information from the feature information set;

determining, based on the partial feature information and the first ranking model, the first ranking result of the multiple candidate recommendation information in the candidate recommendation information set;

determining, by using the second ranking model, a second ranking result of the multiple candidate recommendation information in the candidate recommendation information set based on the first ranking result, the historical feature information, the candidate feature information of each candidate recommendation information in the candidate recommendation information set, and the sequence feature information of the candidate recommendation information set under each search time limitation; and determining, according to the second ranking result, the target recommendation information from the candidate recommendation information set.

7. The method according to claim 6, wherein determining, according to the second ranking result, the target recommendation information from the candidate recommendation information set comprises:

selecting, according to ranked positions of the multiple candidate recommendation information as indicated by the second ranking result, a preset number of candidate recommendation information from the candidate recommendation information set, and determining the preset number of candidate recommendation information as the target recommendation information; and/or selecting, according to the estimated click-through rate of each candidate recommendation information as indicated by the second ranking result, candidate recommendation information with an estimated click-through rate greater than a threshold value from the candidate recommendation information set, and determining the candidate recommendation information with the estimated click-through rate greater than the threshold value as the target recommendation information.

8. An electronic device, comprising:

a processor; and a memory, being in communication connection to the processor, wherein one or more computer-executable instructions are stored on the memory, and the one or more computer-executable instructions, when executed by the processor, cause the processor to perform steps of an information recommendation method;

wherein the information recommendation method comprises:

receiving input information in a search box of an application program as current search information through a GUI (graphical user interface) of the electronic device, and obtaining a candidate recommendation information set which matches the current search information, wherein the candidate recommendation information set comprises multiple candidate recommendation information, the multiple candidate recommendation information comes from multi-path recall, recall sources of the multi-path recall comprise at least one of selected from the group consisting of: user behavior of a user terminal matched with the current search information, social contact of the user terminal, and historical search mode, wherein data of the recall sources is stored in a storage device, and the multiple candidate recommendation information is obtained by accessing the storage device;

determining, according to search volumes of the multiple candidate recommendation information within different search time limitations, sequence feature information of the candidate recommendation information set under each search time limitation, wherein the sequence feature information is used to reflect an overall search feature corresponding to the candidate recommendation information set; and determining target recommendation information based on a trained target ranking model and the sequence feature information of the candidate recommendation information set under each search time limitation; and displaying the target recommendation information on the GUI;

wherein the determining target recommendation information based on the trained target ranking model and the sequence feature information of the candidate recommendation information set under each search time limitation, comprises:

inputting the sequence feature information of the candidate recommendation information set under each search time limitation to the trained target ranking model that is run in the electronic device, to obtain an estimated click-through rate corresponding to each candidate recommendation information in the candidate recommendation information set;

based on the estimated click-through rate corresponding to each candidate recommendation information, selecting a predetermined number of candidate recommendation information as the target recommendation information;

wherein the trained target ranking model comprises a first ranking model and a second ranking model, and a model accuracy of the second ranking model is greater than a model accuracy of the first ranking model;

inputting, by a terminal device, the sequence feature information of the candidate recommendation information set under each search time limitation to the trained target ranking model that is run in the terminal device, to obtain the estimated click-through rate corresponding to each candidate recommendation information in the candidate recommendation information set, comprises:

selecting partial feature information in a feature information set comprising the sequence feature information of the candidate recommendation information set under each search time limitation, and inputting the selected partial feature information into the first ranking model running in the terminal device, and predicting an initial click-through rate of each candidate recommendation information;

determining a first ranking result of the multiple candidate recommendation information according to the initial click-through rate corresponding to each candidate recommendation information; and determining, based on the first ranking result and the sequence feature information of the candidate recommendation information set under each search time limitation, the estimated click-through rate corresponding to each candidate recommendation information by using the second ranking model running in the terminal device.

9. The electronic device according to claim 8, wherein the sequence feature information comprises ranking feature information and variance feature information, the ranking feature information is used to reflect a ranking feature of the multiple candidate recommendation information in the candidate recommendation information set in terms of a size of search volume, and the variance feature information is used to reflect a deviation degree of the search volumes of the multiple candidate recommendation information with respect to an average search volume corresponding to the candidate recommendation information set.

10. The electronic device according to claim 9, wherein the variance feature information is determined according to steps comprising:

for each search time limitation, determining an average search volume under the search time limitation according to the search volumes of the multiple candidate recommendation information in the candidate recommendation information set within the search time limitation;

determining a search volume standard deviation under the search time limitation based on the average search volume and a search volume of each of the multiple candidate recommendation information within the search time limitation; and determining variance feature information of the candidate recommendation information set under the search time limitation based on the search volume standard deviation, the average search volume, and the search volumes of the multiple candidate recommendation information within the search time limitation.

11. The electronic device according to claim 10, wherein determining the variance feature information of the candidate recommendation information set under the search time limitation based on the search volume standard deviation, the average search volume, and the search volumes of the multiple candidate recommendation information within the search time limitation comprises:

for each candidate recommendation information, determining a search volume difference value based on the average search volume and a search volume of the candidate recommendation information within the search time limitation, and dividing the search volume difference value by the search volume standard deviation to obtain a search volume ratio value of the candidate recommendation information; and determining the variance feature information of the candidate recommendation information set under the search time limitation based on search volume ratio values to which the multiple candidate recommendation information corresponds.

12. The electronic device according to claim 8, wherein determining the target recommendation information based on the trained target ranking model and the sequence feature information of the candidate recommendation information set under each search time limitation comprises:

determining candidate feature information of each candidate recommendation information in the candidate recommendation information set, wherein the candidate feature information comprises text feature information and/or vertical category feature information;

obtaining historical feature information authorized by a user, wherein the historical feature information comprises behavior feature information and/or background feature information; and determining, by using the trained target ranking model, the target recommendation information based on the historical feature information, the candidate feature information of each candidate recommendation information in the candidate recommendation information set, and the sequence feature information of the candidate recommendation information set under each search time limitation.

13. The electronic device according to claim 12, wherein the feature information set further comprises the historical feature information, and the candidate feature information of each candidate recommendation information in the candidate recommendation information set, and determining, by using the trained target ranking model, the target recommendation information based on the historical feature information, the candidate feature information of each candidate recommendation information in the candidate recommendation information set, and the sequence feature information of the candidate recommendation information set under each search time limitation comprises:

selecting the partial feature information from the feature information set;

determining, based on the partial feature information and the first ranking model, the first ranking result of the multiple candidate recommendation information in the candidate recommendation information set;

determining, by using the second ranking model, a second ranking result of the multiple candidate recommendation information in the candidate recommendation information set based on the first ranking result, the historical feature information, the candidate feature information of each candidate recommendation information in the candidate recommendation information set, and the sequence feature information of the candidate recommendation information set under each search time limitation; and determining, according to the second ranking result, the target recommendation information from the candidate recommendation information set.

14. The electronic device according to claim 13, wherein determining, according to the second ranking result, the target recommendation information from the candidate recommendation information set comprises:

selecting, according to ranked positions of the multiple candidate recommendation information as indicated by the second ranking result, a preset number of candidate recommendation information from the candidate recommendation information set, and determining the preset number of candidate recommendation information as the target recommendation information; and/or selecting, according to the estimated click-through rate of each candidate recommendation information as indicated by the second ranking result, candidate recommendation information with an estimated click-through rate greater than a threshold value from the candidate recommendation information set, and determining the candidate recommendation information with the estimated click-through rate greater than the threshold value as the target recommendation information.

15. A non-transitory computer-readable storage medium, wherein the non-transitory computer-readable storage medium is configured to store computer-executable instructions, and the computer-executable instructions, when executed by a processor, cause the processor to:

receive input information in a search box of an application program as current search information through a GUI (graphical user interface), and obtain a candidate recommendation information set which matches the current search information, wherein the candidate recommendation information set comprises multiple candidate recommendation information, the multiple candidate recommendation information comes from multi-path recall, recall sources of the multi-path recall comprise at least one of selected from the group consisting of: user behavior of a user terminal matched with the current search information, social contact of the user terminal, and historical search mode, wherein data of the recall sources is stored in a storage device, and the multiple candidate recommendation information is obtained by accessing the storage device;

determine, according to search volumes of the multiple candidate recommendation information within different search time limitations, sequence feature information of the candidate recommendation information set under each search time limitation, wherein the sequence feature information is used to reflect an overall search feature corresponding to the candidate recommendation information set; and determine target recommendation information based on a trained target ranking model and the sequence feature information of the candidate recommendation information set under each search time limitation; and display the target recommendation information on the GUI;

wherein the determine target recommendation information based on the trained target ranking model and the sequence feature information of the candidate recommendation information set under each search time limitation, comprises:

inputting the sequence feature information of the candidate recommendation information set under each search time limitation to the trained target ranking model that is run in the processor, to obtain an estimated click-through rate corresponding to each candidate recommendation information in the candidate recommendation information set;

based on the estimated click-through rate corresponding to each candidate recommendation information, selecting a predetermined number of candidate recommendation information as the target recommendation information;

wherein the trained target ranking model comprises a first ranking model and a second ranking model, and a model accuracy of the second ranking model is greater than a model accuracy of the first ranking model;

inputting, by a terminal device, the sequence feature information of the candidate recommendation information set under each search time limitation to the trained target ranking model that is run in the terminal device, to obtain the estimated click-through rate corresponding to each candidate recommendation information in the candidate recommendation information set, comprises:

selecting partial feature information in a feature information set comprising the sequence feature information of the candidate recommendation information set under each search time limitation, and inputting the selected partial feature information into the first ranking model running in the terminal device, and predicting an initial click-through rate of each candidate recommendation information;

determining a first ranking result of the multiple candidate recommendation information according to the initial click-through rate corresponding to each candidate recommendation information;

determining, based on the first ranking result and the sequence feature information of the candidate recommendation information set under each search time limitation, the estimated click-through rate corresponding to each candidate recommendation information by using the second ranking model running in the terminal device.

16. The medium according to claim 15, wherein the sequence feature information comprises ranking feature information and variance feature information, the ranking feature information is used to reflect a ranking feature of the multiple candidate recommendation information in the candidate recommendation information set in terms of a size of search volume, and the variance feature information is used to reflect a deviation degree of the search volumes of the multiple candidate recommendation information with respect to an average search volume corresponding to the candidate recommendation information set.

17. The medium according to claim 16, wherein the variance feature information is determined according to steps comprising:

for each search time limitation, determining an average search volume under the search time limitation according to search volumes of the multiple candidate recommendation information in the candidate recommendation information set within the search time limitation;

determining a search volume standard deviation under the search time limitation based on the average search volume and a search volume of each of the multiple candidate recommendation information within the search time limitation; and determining variance feature information of the candidate recommendation information set under the search time limitation based on the search volume standard deviation, the average search volume, and the search volumes of the multiple candidate recommendation information within the search time limitation.

18. The medium according to claim 17, wherein determining the variance feature information of the candidate recommendation information set under the search time limitation based on the search volume standard deviation, the average search volume, and the search volumes of the multiple candidate recommendation information within the search time limitation comprises:

for each candidate recommendation information, determining a search volume difference value based on the average search volume and a search volume of the candidate recommendation information within the search time limitation, and dividing the search volume difference value by the search volume standard deviation to obtain a search volume ratio value of the candidate recommendation information; and determining the variance feature information of the candidate recommendation information set under the search time limitation based on search volume ratio values to which the multiple candidate recommendation information corresponds.

19. The medium according to claim 15, wherein determining the target recommendation information based on the trained target ranking model and the sequence feature information of the candidate recommendation information set under each search time limitation comprises:

determining candidate feature information of each candidate recommendation information in the candidate recommendation information set, wherein the candidate feature information comprises text feature information and/or vertical category feature information;

obtaining historical feature information authorized by a user, wherein the historical feature information comprises behavior feature information and/or background feature information; and determining, by using the trained target ranking model, the target recommendation information based on the historical feature information, the candidate feature information of each candidate recommendation information in the candidate recommendation information set, and the sequence feature information of the candidate recommendation information set under each search time limitation.

* * * * *